United States Patent [19]

Evans

[11] Patent Number: 5,776,281

[45] Date of Patent: *Jul. 7, 1998

[54] METHOD OF MANUFACTURING A PALLET MADE OF COMPOSITE FIBER REINFORCED POLYOLEFIN

[76] Inventor: Daniel W. Evans, 8265 St. Marlo Fairway Dr., Duluth, Ga. 30155

[*] Notice: The term of this patent shall not extend beyond the expiration date of Pat. No. 5,585,054.

[21] Appl. No.: 711,059

[22] Filed: Sep. 9, 1996

Related U.S. Application Data

[62] Division of Ser. No. 400,662, Mar. 8, 1995, abandoned.

[51] Int. Cl.[6] .................... B29C 47/08; B32B 31/14; B32B 31/30
[52] U.S. Cl. .................... 156/244.17; 156/244.11; 156/244.18; 156/256; 156/272.2; 156/272.4; 156/275.1; 156/309.6
[58] Field of Search .................... 156/244.11, 245, 156/272.2, 275.1, 275.7, 256, 292, 308.2, 309.6, 244.17, 244.18, 244.19, 272.4; 264/83, 177.2, 178 R, 211.12, 211.21, 211.23; 108/51.1, 53.1, 53.3; 523/200, 318; 525/333.8, 388; 528/483; 530/50

[56] References Cited

U.S. PATENT DOCUMENTS

| | | |
|---|---|---|
| 2,825,099 | 3/1958 | Simmons . |
| 3,100,917 | 8/1963 | Wagner . |
| 3,409,711 | 11/1968 | Pashak et al. . |
| 3,453,356 | 7/1969 | Kent et al. . |
| 3,478,138 | 11/1969 | Friesner . |
| 3,815,657 | 6/1974 | Malek et al. . |
| 3,850,116 | 11/1974 | Mackes ................. 414/787 |
| 3,931,094 | 1/1976 | Segal et al. . |
| 4,059,057 | 11/1977 | Carnwath ................. 108/51.1 |
| 4,078,348 | 3/1978 | Rothman . |
| 4,110,094 | 8/1978 | Motsinger . |
| 4,131,637 | 12/1978 | Bernstein et al. ................. 523/330 |
| 4,223,487 | 9/1980 | St. Clair . |
| 4,236,365 | 12/1980 | Wheeler . |
| 4,288,887 | 9/1981 | Johnson et al. . |
| 4,405,404 | 9/1983 | Blom ................. 264/40.4 |
| 4,467,728 | 8/1984 | Horne . |
| 4,785,040 | 11/1988 | Gupta et al. . |
| 4,790,966 | 12/1988 | Sandberg et al. . |
| 4,839,114 | 6/1989 | Delphin et al. . |
| 4,860,512 | 8/1989 | Thorn . |
| 4,927,579 | 5/1990 | Moore . |
| 5,042,397 | 8/1991 | Fiedler . |
| 5,044,757 | 9/1991 | Dienst . |
| 5,106,564 | 4/1992 | Iwanami et al. . |
| 5,238,633 | 8/1993 | Jameson . |
| 5,492,069 | 2/1996 | Alexander et al. . |
| 5,585,054 | 12/1996 | Evans ................. 264/40.4 |

FOREIGN PATENT DOCUMENTS

0426619  5/1991  European Pat. Off. .

*Primary Examiner*—Richard Crispino
*Attorney, Agent, or Firm*—Hinkle & Associates, P.C.

[57] ABSTRACT

A method of manufacturing a pallet made of a composite cellulose fiber reinforced polyethylene is disclosed. The composite polyethylene is produced through a process which blends preheated cellulose fibers with molten polyethylene. The blend of polyethylene and fibers is combined with ozone gas to form a polyethylene and fiber matrix. The polyethylene and fiber matrix is then fed to an extruder where it is further mixed, heated and then extruded through one of a series of dies to create the components of the pallet. The pallet has excellent rigidity and is welded together by coating meeting surfaces with a bonding material of blended high density polyethylene and iron oxide, placing the pallet into an electromagnetic field, and energizing the pallet with electromagnetic field having a frequency between 1 megahertz and 100 megahertz, causing the bonding material to melt and fuse the meeting surfaces.

21 Claims, 5 Drawing Sheets

Fig_6

Fig_7

126

128

112A

Fig_8

METHOD OF MANUFACTURING A PALLET MADE OF COMPOSITE FIBER REINFORCED POLYOLEFIN

This is a divisional of U.S. application Ser. No. 08/400, 662, now abandoned, filed Mar. 8, 1995, now abandoned, by Daniel W. Evans.

BACKGROUND OF THE INVENTION

1. Field of Invention

The present invention relates to pallets made of composite fiber reinforced polyethylene and a method of manufacturing the pallets.

2. Description of Related Art

Wood pallets are known and widely used throughout the United States. They are generally very useful in the shipping of containers and products, since they provide a stable platform upon which a product or container can be affixed and they provide easy access for lifting mechanisms, such as fork lifts and toe motors.

However, wood pallets have significant disadvantages. They tend to break easily, especially when the powerful fork lifts and tow motors crush them when lifting or storing them improperly. Wood pallets also tend to deplete an important natural resource, trees. Wood pallets are difficult to dispose of when they are damaged or broken. Wood pallets are also generally unable to be repaired; once they are broken, they must be discarded.

Plastic has been viewed as an attractive alternative to many wood products. Plastic can be repaired. Plastic can be recycled. Further, in some cases, plastic can be designed and configured to provide superior performance than other natural materials, such as wood. Heretofore, however, such plastic has not been available with the requisite strength and cost properties to provide a effective substitute or replacement for wood pallets.

Reinforcing plastics with fibers is known in the art. However, methods for producing reinforced polyethylene have been difficult due to the nonpolar surface of both the polyethylene and cellulose fibers. This phenomena prohibits chemical coupling and reduces mechanical mixing between the two materials. Past efforts include combining materials into polyethylene by mixing so as to cause intertwining of the molecules. Proper intertwining requires generating sufficient mix and one hundred percent "wetting of the fiber." The wetting of the fiber refers to completely surrounding fiber molecules with polyethylene molecules.

The mixing method incorporated first added lubricants such as a wax or paraffin based low molecular weight polyethylene resin to the polyethylene, followed by injecting the cellulose fibers downstream into the melt flow of the resin when it was sufficiently molten to flow around the fibers. Without a molecular coupling, the resin that surrounds the fiber has a dramatically higher rate of expansion, causing a pull away from the surfaces between the resin and the fibers. This "pulling away" between the two surfaces causes microscopic points of leverage, resulting in a weak composite matrix. A weak composite matrix results in lower impact values and reduced structural rigidity. Additionally, the wax based polyethylene has a dramatically lower molecular weight and is, therefore, substantially weaker.

SUMMARY OF THE INVENTION

In accordance with the present invention, an extrusion process for the continuous extrusion of polyethylene and cellulose-based fibers in a matrix, is disclosed. The continuous extrusion process utilizes high density polyethylene, cellulose-based fibers, ozone and coupling agents. Polyethylene, cellulose-based fibers and coupling agents are blended. The ozone is then added to the resultant material to create a chemically and molecularly linked reinforced polyethylene material which is gravimetrically fed through a twin screw extruder and into a die, having a sheet, profile, calibrated or accumulator head configuration. The resultant product is a composite fiber reinforced polyethylene material that has significant improvements over the existing polyethylene materials. The resulting plastic product is then formed into a pallet by extruding the reinforced polyethylene through a die, into a bath of cooling liquid, and finally cutting the materials to the proper length.

It is, therefore, an objective of the present invention to provide a method for producing a plastic pallet made of a polyethylene and fiber matrix through a continuous extrusion process and extrusion of lineal members for assemblage into the pallet.

It is also an objective of the present invention to produce a composite fiber reinforced polyethylene material that has sufficient structural rigidity for use as a material for pallet construction.

It is another objective of the present invention to produce a composite fiber reinforced polyethylene pallet that requires low raw material costs, and improved economics.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawing which form a part hereof and herein.

DESCRIPTION OF THE PREFERRED EMBODIMENT

Referring now to the drawings wherein the showings are for purposes of illustrating a preferred embodiment of the invention only and not for purposes of limiting the same, with reference to FIGS. 2–11 the preferred pallet 112 is illustrated. With special reference to FIGS. 9–11, a pallet 112 according to the invention is illustrated. The configuration of the pallet 112 can take on a variety of configurations depending on the application. The aspects of the pallet 112 which are of most importance for this patent application concern the material of which the pallet 112 is made, how that material is manufactured and how the manufactured material is then formed into the pallet.

Figures 9, 10, 11:
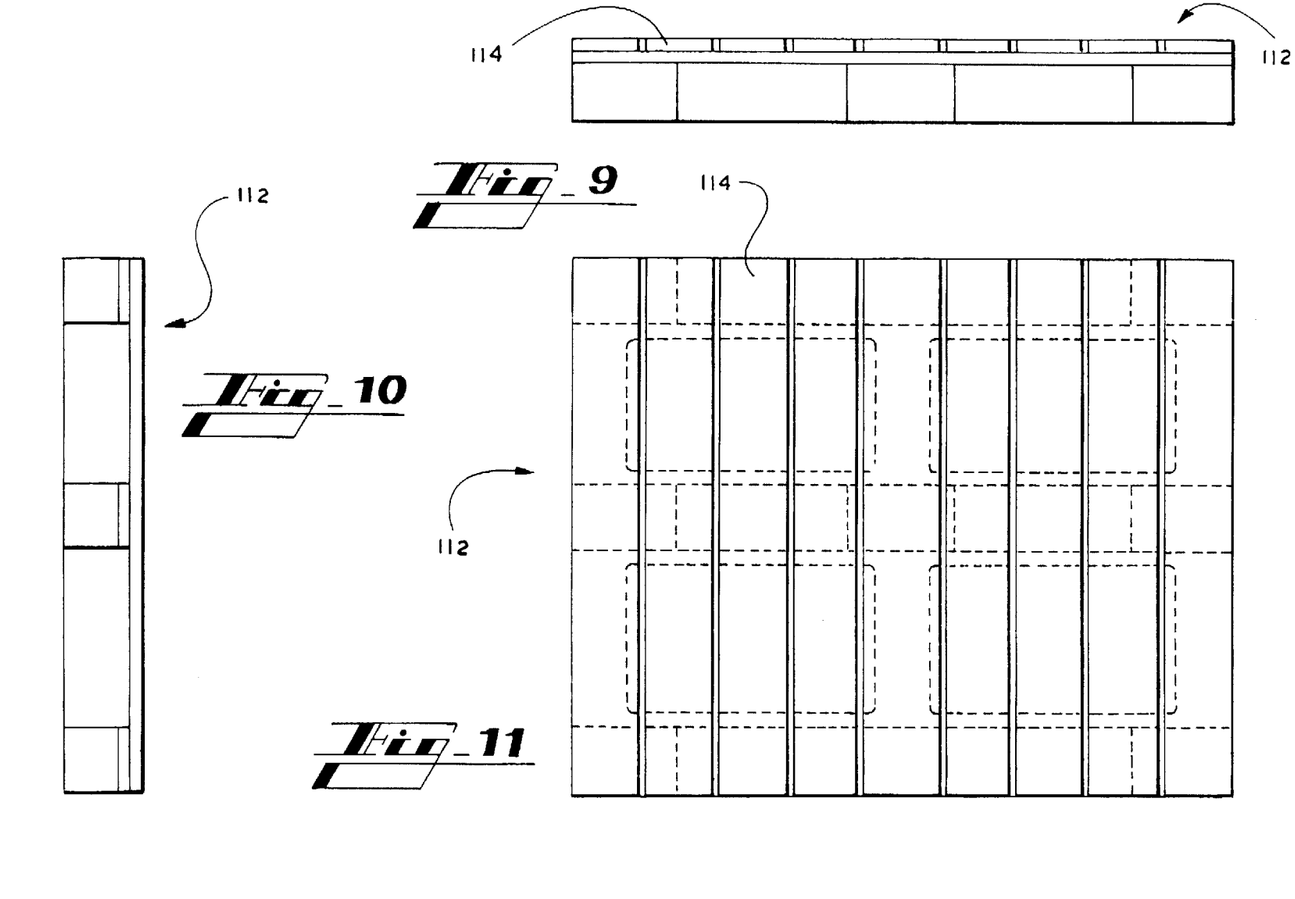
FIG. 9 is a front view of a pallet according to the invention.
FIG. 10 is a side view of a pallet according to the invention.
FIG. 11 is a top view of the pallet shown in FIGS. 9 and 10.

The preferred pallet design is that shown in FIGS. 9–11. The pallet 112 disclosed there is manufactured by extruding material through seven standard profile dies. These profile dies can generally meet the configuration of most pallet sizes. The profile dies are a 4 inch by 5 inch block, a 2.3 inch by 5 inch block, a 0.75 inch by 5 inch top deck board, a 0.75 inch by 5 inch stringer board, a 3 inch angle, a 1.5 inch angle, and a 0.75 inch by 2 inch U-channel.

Figure 2:
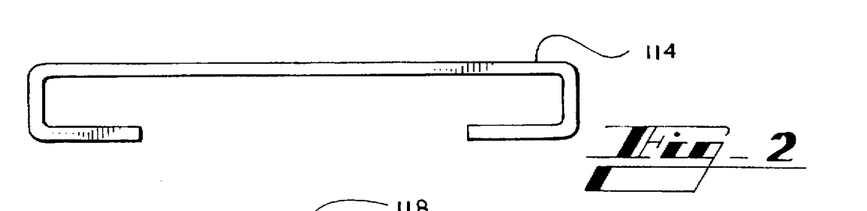
FIGS. 2–7 are cross-sectional views of various lineal members which are extruded using the preferred material to create the preferred pallet according to the invention.

With reference to FIG. 2, a cross-sectional view of a top deck board 114 is shown. In the preferred embodiment, the top deck board 114 is about 5 inches in width, about 0.75 inches in height, and has a material thickness of about 0.125 inches.

Figure 3:
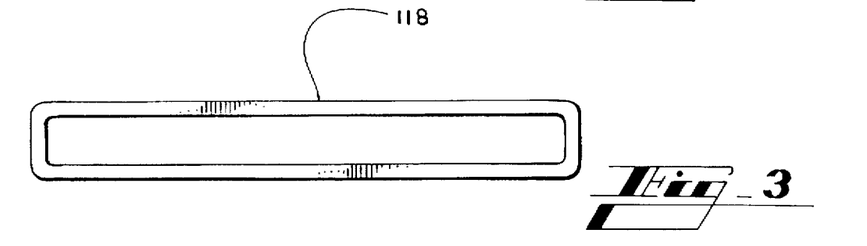

With reference to FIG. 3, a stringer board 118 is illustrated. In the preferred embodiment, the stringer board is about 5 inches wide, about 0.75 inches thick, and is made of material approximately 0.125 inches thick.

Figure 4:
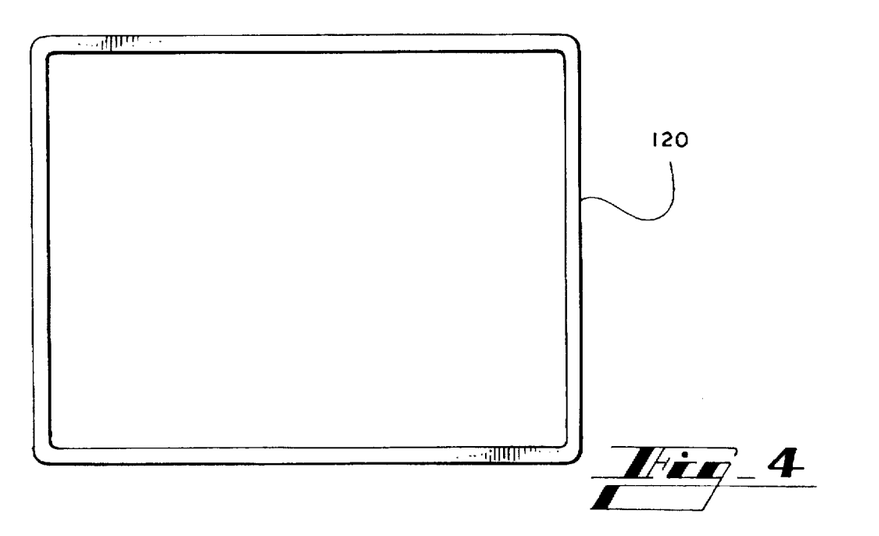

With reference to FIG. 4, a 4 inch by 5 inch block member 120 is illustrated. This member is about 5 inches wide, about 4 inches high, and has a thickness of about 0.300 inches.

Figure 5:
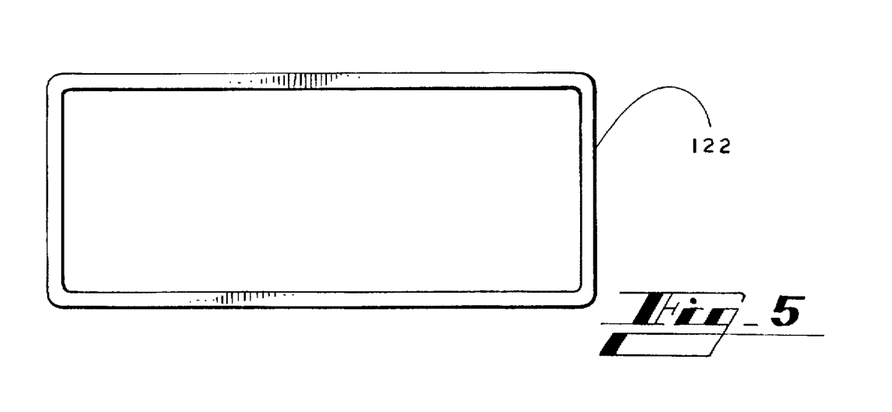

With reference to FIG. 5, a 2 inch block member is illustrated. The 2 inch block member 122 has a width of about 5 inches, a height of about 2.3 inches, and a wall thickness of about 0.3 inches.

Figure 6:
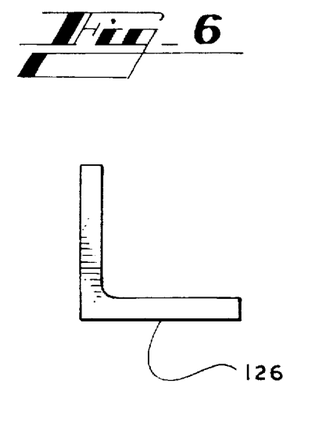

With reference to FIG. 6, a 1.5 inch angle member 126 is illustrated. The 1.5 inch angle member 126 has legs which are each about 1.5 inches long and a wall thickness of 0.2 inches.

Figure 7:
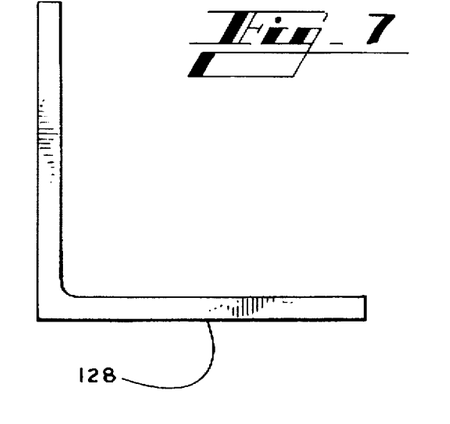

With reference to FIG. 7, a 3 inch angle member 128 is illustrated. Each of the legs of the 3 inch angle member 128 are 3 inches long and it also has a wall thickness of about 0.2 inches.

Figure 8:
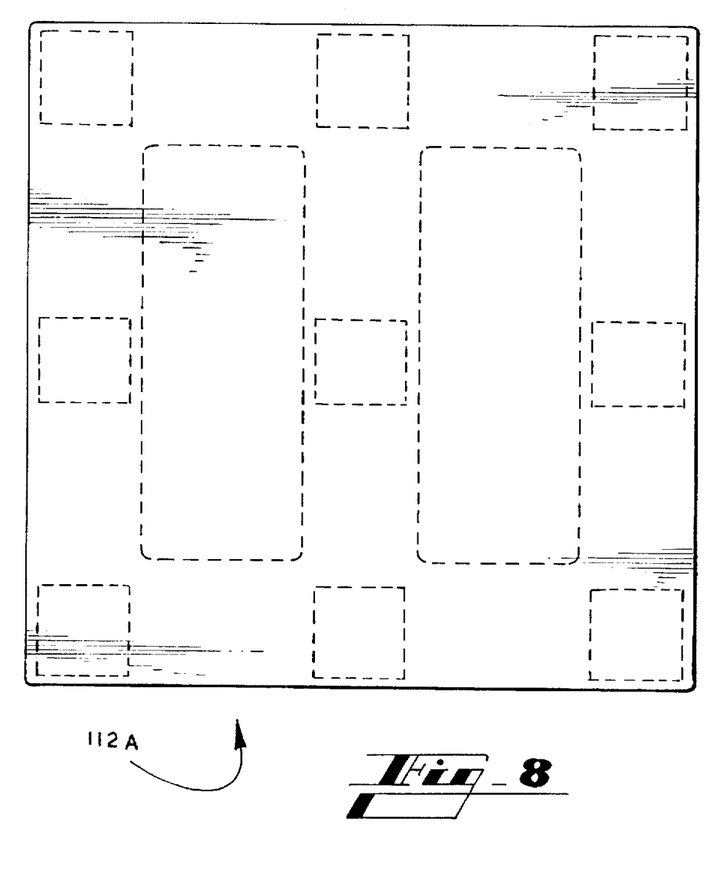
FIG. 8 is a top view with hidden lines showing one preferred pallet design.

With reference to FIG. 8, one type pallet design is illustrated. The pallet 112A in that view is 3 feet by 3 feet square.

With reference to FIGS. 9–11, a preferred pallet 112 is illustrated which has overall dimensions of 40 inches by 48 inches.

The most important aspect of the inventive pallet 112 is the material of which it is made. The material and the process for its manufacture is the subject of my copending patent application Ser. No. 08/400,669, filed on Mar. 8, 1995, now U.S. Pat. No. 5,585,054 issued on Dec. 17, 1996. The preferred material utilizes a high density polyethylene, made up of long chains of linked ethylene molecules. The benefit of these long chains are its superior strength properties, including rigidity and hardness.

The rigidity of the polyethylene occurs due to its crystalline properties. Additionally, the high density polyethylene has a low specific gravity and is commercially, the least expensive of commodity grade resins, in the marketplace. The high density polyethylene has a density in the range of 0.941 to 0.960 g/cc. While the high density polyethylene is the preferred material of the present invention, polyethylene resins having 500 to 2500 ethylene links in chain will also function within the boundaries of this invention. The process and resulting material will function with any material generally in the polyolefin family. For example, polypropylene and thermoplastic rubbers will also work. Polyethylene is the preferred material, primarily due to its low cost.

Generally, combining two materials to generate strength requires either a chemical or mechanical linking between the two materials, or preferably both. The term "chemical linking" means that the two materials must be chemically compatible or have sufficient random electrons with which to couple materials. By way of contrast, the term "mechanical linking" means that the molecules of each of the two materials have sufficiently long molecular strands or a dramatic molecular branching configuration to allow for the molecules to intertwine. Polyethylene molecules are generally chemically noncompatible. Furthermore, polyethylene molecules have non-polar surfaces which resist coupling. Therefore, forming matrices having polyethylene as a component have proven to be difficult.

A broad definition of cellulose fibers for the purposes of the present invention is "any fibers where the main constituents are of natural fibers or plant tissue." Common cellulose fibers include wood pulp, cotton and twine (i.e., jute, kenaf, sisal, etc.). These fibers are light, provide flexible impact properties, generate rigidity when compressed, are readily available and very economic. Additionally, old wood pallets which have been reduced to fiber form may be utilized. The feature is especially important when the material is manufactured into pallets, as the subject invention described herein. This feature aids in the conversion of companies utilizing wood pallets to the innovative technology described herein.

Generally, the cellulosic fibers are between one and six millimeters in diameter and about thirteen millimeters long. By conducting tests, fiber lengths having lengths greater than thirteen millimeters contribute little to the material's physical properties. Longer fibers are also more difficult to process due to their propensity to "hang up" in a die. Fibers having lengths shorter than seven millimeters cause substantially decreased properties. This is likely due to less intertwining of the molecules. Shorter fibers in this process have less of a negative impact on properties due to the true chemical coupling. Since, cellulose fibers are non-polar, they are also resistant to coupling.

The continuous extrusion process of the present invention enables the formation of a polyethylene and fiber matrix which are both chemically coupled and highly intertwined. As shown in schematically in FIGS. 1 and 2, a polymeric resin, color concentrate and coupling/mix additive are blended in a continuous mixer 1. The resin, color concentrate and coupling/mix additive are fed at a constant rate into mixer 1. Mixer 1 is heated to between 260 to 600 degrees F, with the temperature being dependent upon flow rate and melt index of the combined materials. The optimal temperature for high density polyethylene has been determined to be between 435 degrees F and 475 degrees F. The molten, combined materials are then gravimetrically fed to a low shear kneading extruder 2. Extruder 2 acts to thoroughly mix the combined materials. The molten material is then conveyed through an open port 2a of extruder 2, where the molten, combined materials free fall into an ozone chamber 3 which has a vent 3e.

Figure 1:
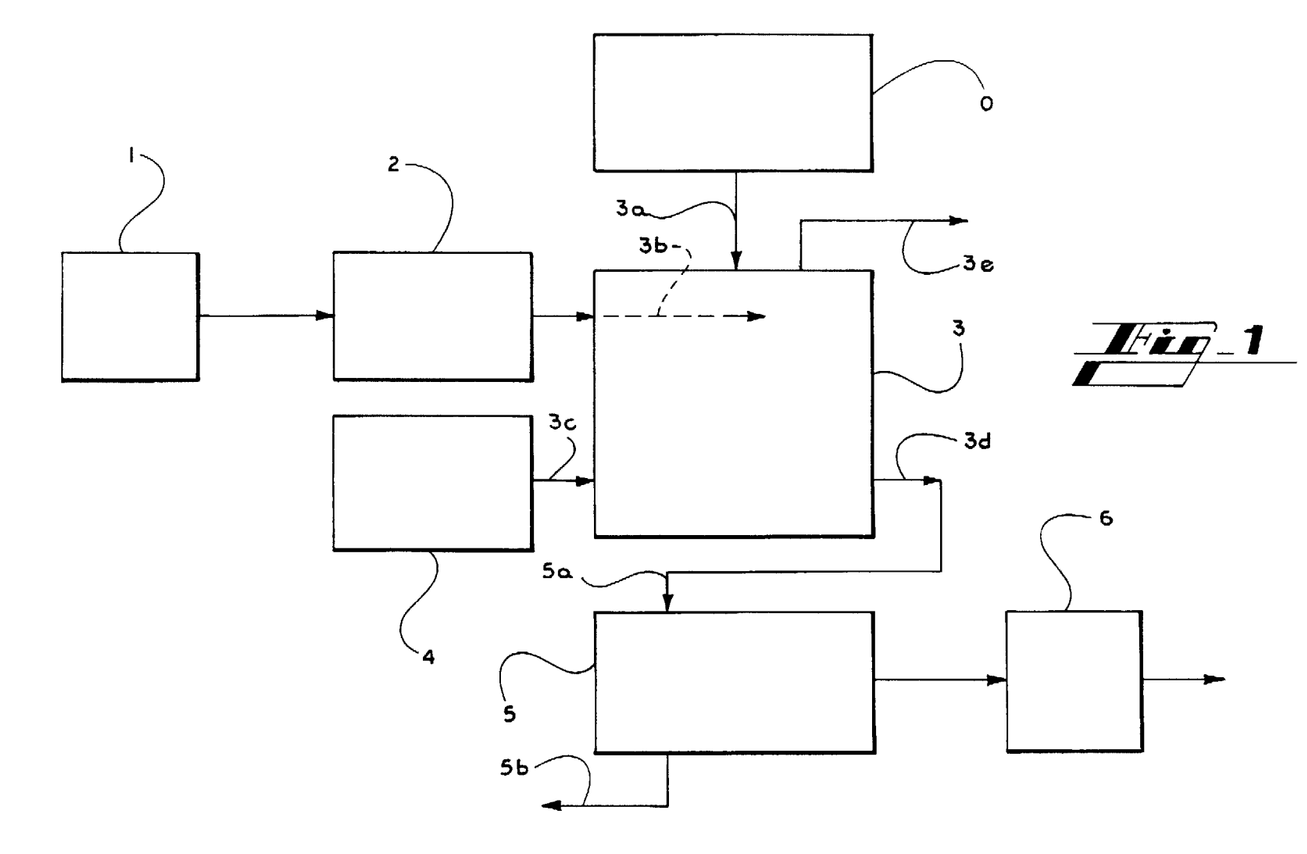
FIG. 1 shows a flow diagram of the method of making fiber reinforced polyethylene.

Cellulose fibers 10 are initially stored within a fiber hopper 12. The fibers are then conveyed via auger 16 to an enclosed screw cram feed 4 which proportions the cellulose fibers with consistency. Cram feed 4 is heated to between 150 degrees F and 400 degrees F. The fibers are heated in a fiber heater 20 so that when they come into contact with the heated combined materials, the combined polyethylene fiber matrix does not chill off and cause flow concerns. The heated cellulose fibers are then conveyed into ozone chamber 3.

Ozone is pumped into ozone chamber 3 from an ozone generator O through a first input 3a, positioned in a top portion of chamber 3. Ozone generator O generates an electrical charge across a flow of oxygen and induces a corona burst. This corona burst creates ozone, atomic oxygen, oxygen free radicals, and high speed electrons. Ozone generator O modifies oxygen ($O_2$) to ozone ($O_3$). The molten, combined materials enter chamber 3 through a second input 3b. Input 3b is positioned on a side of chamber 3 and directly below input 3a. Input 3b actually comes to a center portion C of chamber 3, such that molten, combined materials do not hang up on the sides of chamber 3. A third input 3c is positioned directly below input 3b. Heated cellulose fibers enter chamber 3 through input 3c. The ozone, molten combined materials and fibers mix within chamber 3 and gravimetrically free fall into an extruder output 3d positioned at the bottom of chamber 3. Extruder output 3d is in flow communication with a feed throat 5a of a conventional 24:1 aspect ratio twin screw extruder 5. An output 3e, positioned at another top portion of chamber 3 acts to counter pressure build up which occurs due to ozone falling into chamber 3 through output 3a. Output 3e additionally forces oxygen to rise to the top and out of chamber 3 through 3e, thereby forming a total ozone environment in chamber 3. The coupled polyethylene fiber matrix (hereinafter referred to as cellulose fiber reinforced polyethylene) exits chamber 3 and falls into feed throat 5a of twin screw extruder 5. Remaining ozone continues to mix with the cellulose fiber reinforced polyethylene, causing greater coupling. Twin screw extruder 5 has two screws (not shown) which mixes and kneads the cellulose fiber reinforced polyethylene as it is being conveyed. The cellulose fiber reinforced polyethylene travels through the flights of the screws and is heated, thereby causing it to compress. The extruder 5 has a vent 5b, through which any remaining oxygen can exhaust. The cellulose fiber reinforced polyethylene fully stabilizes at it travels through the screws. The cellulose fiber reinforced polyethylene subsequently flows through extruder 5 and into a die 6. Die 6 may be configured in a sheet, profile, calibrated or accumulator head. The cellulose fiber reinforced polyethylene enters die 6 and is formed into a desired configuration, determined by the die head.

Although the material described above can be used for a variety of products, in the present invention, the product is a pallet 112 and the die head configurations are the preferably the seven described previously which yield the components illustrated in FIGS. 2–7.

Proper chemical coupling and intertwining of the molecules occurs in chamber 3. The highly charged free radical electrons attached to the oxygen molecule attacks the surface of the polyethylene and creates oxidation. This oxidation is highly unstable, and susceptible to fairly quick surface electron recoupling. The oxidized polyethylene surface becomes highly polarized. Concurrently, ozone reacts with the cellulose fibers. Free radical electrons oxidize the surface of the cellulose fibers, likely with the hydroxyl, carbonyl and amide groups. While the exact reaction schematic is unknown, the reaction between the oxygen and polyethylene and oxygen and cellulose fibers result in polyethylene and cellulose fibers having highly polarized surfaces. The now free radical electrons seek to stabilize by coupling with other free radical electrons. That is, the surface free radicals in the polyethylene couple with the surface free radicals in the fiber and create a permanent molecular bond. The ozone discharges its unstable electrons to the polyethylene or cellulose fibers and converts back to oxygen. By converting back to oxygen, the molecule rises to the top of chamber 3 and exits through output 3e.

Contacting molten polyethylene (combined materials) with the cellulose fibers in the ozone chamber 3, permits full wetting of the fiber and substantially improved surface to surface contact between the polyethylene and the fibers, thereby allowing for chemical coupling. Fully wetting the fibers with the polyethylene prior to twin screw extruder 5, provides less abrasion to the screw (not shown) and the barrel (not shown) of extruder 5. Additionally, twin screw extruder 5 provides improved mix at much lower temperatures and less shear, both of which are beneficial to the cellulose fibers.

Coupling/mixing agents added to the polyethylene include small quantities of grafted, low melt polyethylene copolymer maleic anhydride. This copolymer aids in the dispersion and mix of the cellulose fibers. Additionally, melting EPDM rubber into polyethylene aids in coupling between polyethylene and the fibers. EDPM rubber has a similar melt, but is highly polarized. Coating or blending additives such as ethylene/acrylic acid copolymer, chromium complexes, silanes, titanantes, and zirconium aluminates aid in coupling the fibers, since these additives listed have highly polarized molecules. The additives listed above can be melted or blended in various proportions, and added in concentrations from 0 to 20% to achieve customized physical properties. Generally, addition of more additives results in lower, desired physical properties. However, when concerned with large percents of fibers, the additives act as lubricants that dramatically aid in improving mix and wetting.

The subsequent composite fiber reinforced polyethylene material has significantly improved marketability over equivalents, namely:

1) Substantially improved structural rigidity;
2) Substantially improved heat deflection temperature;
3) Substantially reduced coefficient of thermal expansion and contraction;
4) Significantly improved impact properties;
5) Significantly improved raw materials costs; and
6) Significantly improved economics associated with the continuous extrusion process.

The process for integrating the fiber reinforced polyethylene material into a pallet begins by utilizing the continuous extrusion process described above which is the subject of my copending patent application Ser. No. 08/400,669, filed on Mar. 8, 1995, now U.S. Pat. No. 5,585,054 issued on Dec. 17, 1996. The seven standard profile dies described previously generally can meet the configuration of most conventional pallet sizes.

Figure 12:
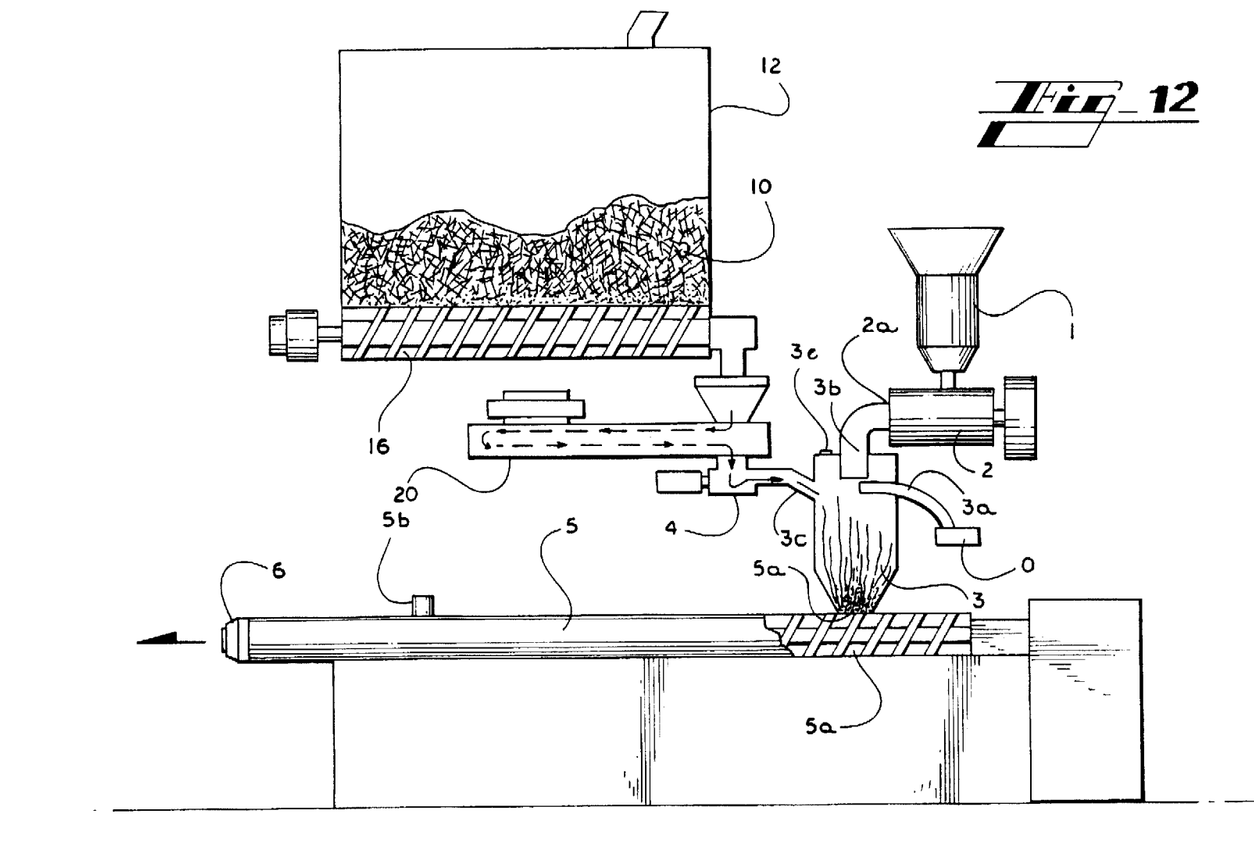
FIG. 12 is shows a flow diagram of the method of making fiber reinforced polyethylene with various devices utilized in the process illustrated schematically.

With reference to FIG. 12, the molten coupled fiber-reinforced polyethylene material flows through the co-rotating twin screw extruder 5 and is forced through a die 6 of one of the nominal shapes described above. The formed material flows from the die into a bath 30 of cooling liquid, preferably chilled water. Thus, it is immediately brought to set temperature. The length of the water bath 30 and the subsequent set time predicates the speed with which the material flows through the die. Tension is maintained on the material by a puller 34 situated at a far end of the water table. The material passes through the puller 34 and into a cutting means 36, such as a compound sheer configuration or a traversing saw, which cuts the formed material to a desired length. The lengths of such formed material are commonly referred to as "profile lineals." The profile lineals can be cut further to customize to any pallet size.

A pallet, such as the pallet 112 illustrated in FIGS. 9–11, is comprised of a secession of profile lineals. Generally a pallet comprises nine blocks 120,122, three or four stringer boards 118, and a sufficient quantity of top deck boards 114. A crate (not shown) can be comprised of a pallet 112 with upward angles.

The profile lineals are configured into a pallet 112 as follows. The profile lineals are stacked in such a configuration to make a standard four-way entry pallet. A bead or tape of an extrudate is located at all the meeting points of the lineals. This extrudate is generally a blend of high density polyethylene and iron oxide, generally in a 50%/50% blend. The stacked profiles will be placed inside a fixture in between two elements. The fixture is a device which can create an induction magnetic field. The elements are attached to a high frequency power source and an induction cooling which will generate 3 megahertz to 8 megahertz and create an electrical magnetic field. This frequency activates the iron oxide and causes it to oscillate quickly, generating frictional heat which melts the polyethylene blend and which additionally melts and fuses the surfaces of the lineals. Thus, the lineals are fastened together securely.

The pallet 112 described above provides many improved qualities over other equivalents, especially wood pallets. Among these benefits are improved structural rigidity, heat deflection, temperature ranges, reduced coefficients of thermo expansion and contraction, and improved durability, and improved ease of manufacturing, improved ability to customize sizes, improved rackability, a lighter material providing equivalent strength, improved raw material costs, improved economies associated with a continuous extrusion process, assembly of the extruded lineals, a lack of necessary customizing tools, the ability to repair rather than discard the damaged products and a longer life cycle.

Among the most important benefits of the above-described pallet is its repairability. No matter how carefully a pallet is used, pallets are abused and damaged. The conventional way for repairing a wood pallet is to remove the nails and replace the boards or blocks. This is a highly labor intensive process and generally results in a structurally weaker pallet. However, the above-described pallet 112 can be repaired by reinserting the pallet back into the welding equipment. By energizing the iron oxide with frequency again, the lineals can be removed and replaced before they cool. The above-described pallet is believed to be the only pallet which does not utilize nails. Any pallet, whether wood, plastic, or any other material, which requires nails provides no significant repair value, since removing and replacing nails is the labor intensive process which makes repair difficult and expensive. Other plastic pallets are formed of a single block of plastic, either by injecting molding or thermo forming. In any event, they are much more expensive than the inventive pallet described herein and less repairable.

If the inventive pallet 112 described herein is damaged beyond repair, it is fully recyclable. The pallet 112 needs to simply be ground up and then blended back into the continuous mixer with virgin polyethylene resin. The only limitation on such regrinding is that no more than a 50/50 blend of old pallet and virgin polyethylene resin is recommended, due to the amount of iron oxide that will be randomly extruded into the new pallet.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method for manufacturing a composite fiber reinforced polyolefin pallet, comprising the steps of:
   mixing a molten polyolefin and cellulose fibers in the presence of ozone to form a matrix;
   extruding the matrix into a formed material having predetermined shapes of pallet components: and bonding the pallet components together to form a pallet.

2. A method for manufacturing a composite fiber reinforced polyolefin pallet, comprising the steps of:
   mixing a molten polyolefin and cellulose fibers in the presence of ozone to form a matrix;
   extruding the matrix into a formed material having at least one predetermined shape;
   cooling the formed material;
   cutting the formed material into predetermined lengths to form a profile lineal;
   stacking at least two profile lineals to form an array of profile lineals having meeting points; and
   bonding the meeting points together to form the array into a pallet.

3. A method as claimed in claim 2, wherein the polyolefin is selected from the group consisting of polyethylene, polypropylene and thermoplastic rubber.

4. A method as claimed in claim 3, wherein the polyolefin is high density polyethylene.

5. A method as claimed in claim 4, wherein the high density polyethylene has a density in a range from 0.941 g/cc to 0.960 g/cc.

6. A method as claimed in claim 2, wherein the cellulose fiber is natural fiber.

7. A method as claimed in claim 2, wherein the step of cooling the formed material comprises placing the formed material into a bath of cooling liquid.

8. A method as claimed in claim 7, wherein the cooling liquid is chilled water.

9. A method as claimed in claim 2, wherein the step of cooling the formed material comprises cooling the formed material to a set temperature.

10. A method as claimed in claim 9, wherein the step of cooling the formed material is accomplished by placing the formed material into a bath of a cooling liquid.

11. A method as claimed in claim 10, wherein the cooling liquid is chilled water.

12. A method as claimed in claim 2, after the step of cooling the formed material, further comprising the step of maintaining tension on the formed material.

13. A method as claimed in claim 12, wherein the tension is maintained by a puller.

14. A method as claimed in claim 2, wherein the step of cutting the formed material is carried out by a traversing saw.

15. A method as claimed in claim 2, wherein the step of cutting the formed material is carried out by a compound shear configuration.

16. A method as claimed in claim 2, wherein the step of bonding the meeting points together to form the array into a pallet comprises placing a bonding material on at least one of the profile lineals between the meeting points.

17. A method as claimed in claim 16, wherein the bonding material comprises a blend of high density polyethylene and iron oxide.

18. A method as claimed in claim 2, wherein the step of bonding the meeting points together to form the array into a pallet comprises:

placing a bonding material between the meeting points on at least one of the profile lineals; and welding the profile lineals together by melting the bonding material.

19. A method as claimed in claim 18, wherein the step of welding the profile lineals together by melting the bonding material comprises:

placing the array into a device capable of generating an electromagnetic field between 1 megahertz and 100 megahertz;

energizing the device to create the electromagnetic field; and melting the bonding material to cause the profile lineals to melt and fuse together at the meeting points.

20. A method as claimed in claim 19, wherein the bonding material comprises a blend of high density polyethylene and iron oxide.

21. A method as claimed in claim 18, wherein the bonding material comprises a blend of high density polyethylene and iron oxide.

* * * * *